US011731622B2

(12) United States Patent
Jeising et al.

(10) Patent No.: US 11,731,622 B2
(45) Date of Patent: Aug. 22, 2023

(54) PREDICTION OF DYNAMIC OBJECTS AT CONCEALED AREAS

(71) Applicant: Robert Bosch GmbH, Stuttgart (DE)

(72) Inventors: Johannes Jeising, Ditzingen (DE); Minh-Tri Nguyen, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 169 days.

(21) Appl. No.: 17/368,357

(22) Filed: Jul. 6, 2021

(65) Prior Publication Data

US 2022/0009484 A1 Jan. 13, 2022

(30) Foreign Application Priority Data

Jul. 9, 2020 (DE) .......................... 102020208637.0

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *G01S 13/865* (2013.01);
(Continued)

(58) Field of Classification Search
CPC ............ B60W 30/0956; B60W 30/09; B60W 2420/52; B60W 2554/4046; G01S 13/865; G01S 2013/9322
See application file for complete search history.

(56) References Cited

U.S. PATENT DOCUMENTS

| 8,179,281 B2 * | 5/2012 | Strauss ................. G08G 1/163 340/436 |
| 2005/0012604 A1 * | 1/2005 | Takahashi .............. G08G 1/166 340/435 |

(Continued)

FOREIGN PATENT DOCUMENTS

| DE | 102016120218 A1 | 4/2017 |
| DE | 102016011414 A1 | 3/2018 |

OTHER PUBLICATIONS

M. Guo et al., "Multi-sensor information fusion for unmanned cars using radar map," 2012 IEEE 2nd International Conference on Cloud Computing and Intelligence Systems, Hangzhou, China, 2012, pp. 1166-1170, doi: 10.1109/CCIS.2012.6664567. (Year: 2012).*

*Primary Examiner* — Tarek Elarabi
(74) *Attorney, Agent, or Firm* — Norton Rose Fulbright US LLP; Gerard Messina

(57) ABSTRACT

A method for the adaptation of a driving behavior of a vehicle by a control unit. Measurement data collected by at least one radar sensor and/or LIDAR sensor are received and, by evaluating the received measurement data, at least one obstacle within a scanning range of the radar sensor and/or LIDAR sensor is ascertained. Based on the ascertained obstacle and an installation position of the radar sensor and/or LIDAR sensor, a section of the scanning range concealed by the obstacle is ascertained. An object prediction is generated for the concealed section of the scanning range that a dynamic object may potentially cross a driving lane of the vehicle from the concealed section of the scanning range. A driving behavior of the vehicle is adapted as a function of the situation based on the object prediction. A control unit, a computer program, and a machine-readable storage medium are also described.

10 Claims, 3 Drawing Sheets

(51) Int. Cl.
*G01S 13/931* (2020.01)
*G01S 13/86* (2006.01)
(52) U.S. Cl.
CPC ........ *G01S 13/931* (2013.01); *B60W 2420/52* (2013.01); *B60W 2554/4046* (2020.02); *G01S 2013/9322* (2020.01)

(56) References Cited

U.S. PATENT DOCUMENTS

| | | | | |
|---|---|---|---|---|
| 2010/0045482 | A1* | 2/2010 | Strauss | G08G 1/163 340/903 |
| 2021/0208272 | A1* | 7/2021 | Lavian | H03L 7/091 |
| 2021/0383621 | A1* | 12/2021 | Büyükyildiz | G07C 5/04 |

* cited by examiner

PREDICTION OF DYNAMIC OBJECTS AT CONCEALED AREAS

CROSS REFERENCE

The present application claims the benefit under 35 U.S.C. § 119 of German Patent Application No. DE 102020208637.0 filed on Jul. 9, 2020, which is expressly incorporated herein by reference in its entirety.

FIELD

The present invention relates to a method for adapting a driving behavior of a vehicle. The present invention furthermore relates to a control unit, a computer program and to a machine-readable storage medium.

BACKGROUND INFORMATION

Radar sensors and the possibility of using the Doppler effect make it possible to perform relative radial speed measurements between a radar sensor and a reflecting object. Furthermore, radar sensors may be used for determining the position of objects. For these reasons, radar sensors are versatile in their use in driver assistance functions of vehicles. For this purpose, the radar sensors may be used in vehicles of all automation levels in order, for example, to avoid a collision with dynamic objects or at least to generate a collision warning. For this purpose, a scanning range or sensing range of the radar sensor is scanned for detecting static and dynamic objects.

Since the measuring method is based on the Doppler effect, radar beams, which are emitted for examining the traffic surroundings, may be blocked by a static obstruction or obstacle. Due to the obstacle, a section of the scanning range cannot be scanned by radar beams. Such obstacles may be dynamic objects or static objects, which prevent the propagation of the radar beams. Furthermore, weather-related effects such as dense fog or smoke, for example, may also prevent a propagation of the radar beams along the scanning range. Such an obstacle thus results in a loss of the information about dynamic objects, which may result in a potential collision. In particular, the collision probability increases if a dynamic object is located behind the obstruction and can only be detected by the sensor after emerging from behind the concealed section.

SUMMARY

An object of the present invention is to provide a method for increasing traffic safety at concealed sections or at obstacles.

This object may be achieved in accordance with example embodiments of the present invention. Advantageous developments of the present invention are disclosed herein.

According to one aspect of the present invention, a method is provided for adapting a driving behavior of a vehicle via a control unit.

In accordance with an example embodiment of the present invention, in one step, measurement data collected by a radar sensor and/or LIDAR sensor are received. By evaluating the received measurement data, at least one obstacle is ascertained within a scanning range of the radar sensor and/or LIDAR sensor. The obstacle may take the form of an at least temporarily parked dynamic object or a static object.

The obstacle may be embodied for example by construction sites, parked vehicles, parked trailers or containers, vegetation, buildings, smoke or fog, rain or snow, and the like.

In the first step, the obstacle may be detected with regard to a position and a geometry. The detection may occur for example by comparing the measurement data with a radar-based map. Alternatively or additionally, it is possible to detect an obstacle or an obstruction for the radar beams and/or laser beams with the aid of an optical sensor based on a position and geometry of objects.

In a further step, a section of the scanning range concealed by the obstacle is ascertained on the basis of the ascertained obstacle and an installation position of the radar sensor and/or LIDAR sensor. This makes it possible to determine a concealed area or section as a function of the installation position of the sensor on the vehicle and the fact of a linearly propagating radar beam or laser beam.

Subsequently, an object prediction is generated for the concealed section of the scanning range. For this purpose, the object prediction takes into account that a dynamic object may potentially cross a driving lane of the vehicle from the concealed section of the scanning range. If the dimensions of the concealed section are known, it may thus be assumed that dynamic objects located in the concealed section may emerge from the latter and cross the driving lane of the vehicle at any time. The emerging objects become discernible for the sensors of the vehicle as soon as they are in the visual range or are no longer concealed by the obstacle.

The method does not explicitly ascertain a dynamic object behind the obstacle, but it is assumed that there exists a risk that a dynamic object emerges from the concealed section. This risk is taken into account by adapting the driving behavior accordingly. A driving behavior of the vehicle is adapted as a function of the situation and based on the object prediction. The object hypothesis or object prediction may take the form of a probability that a dynamic object crosses the driving lane of the vehicle.

Since the possibility of avoiding a collision depends on various conditions, such as for example on the relative distance of the object and the achievable total braking distance, the probability of a collision increases as the vehicle approaches the concealed section. The method makes it possible to implement a situation-adapted vehicle behavior in proximity of the obstacle and of the concealed area in order to avoid a potential collision. By predicting dynamic objects in the concealed section of the scanning range, it is possible to define an adapted vehicle behavior, so as to ensure an increased traffic safety when driving past the concealed section of the scanning range.

According to another aspect of the present invention, a control unit is provided, the control unit being designed to carry out the method. In accordance with an example embodiment of the present invention, the control unit may be, for example, a vehicle-side control unit, a control unit outside of the vehicle or a server unit outside of the vehicle such as a cloud system for example.

Furthermore, according to one aspect of the present invention, a computer program is provided, which comprises instructions, which, when the computer program is executed by a computer or a control unit, prompt the latter to carry out the method of the present invention. According to another aspect of the present invention, a machine-readable storage medium is provided, on which the computer program of the present invention is stored.

According to the BASt standard (Bundesanstalt für Straßenwesen—Federal Highway Research Institute), the vehicle may be capable of being operated in assisted, partially automated, highly automated and/or fully automated or driverless fashion.

The vehicle may be for example a passenger car, a cargo truck, a robotaxi and the like. The vehicle is not limited to being operated on roads. Rather, the vehicle may also take the form of a watercraft, aircraft, such as for example a transport drone, and the like.

The method may be used particularly advantageously in vehicles capable of being operated in highly automated and fully automated fashion. In the process, it is possible to ascertain obstacles particularly in an urban environment in intersection scenarios with parked vehicle or objects at the edge of the road and to take these into account with a driving behavior adapted as a function of the respective situation. Furthermore, the method may also be used in passing maneuvers, since concealed dynamic objects may be located behind the object or vehicle to be passed.

In one specific embodiment of the present invention, the method is carried out as part of a collision prediction, or the ascertained object prediction and the driving behavior of the vehicle adapted as a function of the situation are used as input variables of the collision prediction. This measure makes it possible to integrate the method particularly efficiently into existing control units and control modules of the vehicle.

In this case, the method may be implemented in the form of a hardware-side and/or software-side module, which is able to influence the driving behavior of the vehicle. The method may control actuators of the vehicle in order to allow for longitudinal guidance and/or lateral guidance of the vehicle.

On the basis of the method, it is in particular possible to provide information regarding visibility, in which areas of the theoretical scanning range or detecting range of the radar sensor no reliable radar data can be generated. On the basis of this knowledge, an object hypothesis about potential dynamic objects is formed.

According to a further exemplary embodiment of the present invention, data of a digital radar map are received and in an evaluation of the measurement data collected by the radar sensor the collected measurement data are compared to the data of the digital radar map in order to ascertain the obstacle and the section of the scanning range concealed thereby. This makes it possible to ascertain static objects and obstacles, it being possible in the process to make use of a previously recorded radar map, which maps a vehicle surroundings without obstructions. Obstacles may be pointed out during travel by a comparison between the radar map and the ascertained measurement data. If specific locations or reflection points exist on the radar map, which are not measurable during travel, then a section concealed by an obstacle may be expected.

The at least one obstacle may be a static object or a dynamic object. Furthermore, an obstacle may be formed by atmospheric or weather-related effects, such as for example fog, rain, smoke and the like. The obstacle prevents at least in areas a propagation of electromagnetic radiation of radar sensors and/or LIDAR sensors and thus shields a section of the scanning range.

According to another specific embodiment of the present invention, the obstacle and the section of the scanning range concealed by the obstacle are ascertained by evaluating measurement data of the LIDAR sensor and/or of measurement data of at least one camera sensor. This measure provides a further possibility for ascertaining the obstacle. Preferably, a sensor data fusion may be implemented with measurement data of further sensors, such as for example camera sensors or LIDAR sensors. In particular, with the aid of optical sensors it is possible to detect obstacles in their appearance and size.

According to a further exemplary embodiment of the present invention, the concealed section of the scanning range is ascertained as a surface or as a volume. As soon as the concealing object or obstacles is detected, this information may be used in order to ascertain the concealed section of the scanning range. The concealed section may be ascertained from linearly propagating radar beams, which strike the static or dynamic obstacle. The space or the surface behind the obstacle represents the concealed section.

According to another specific embodiment of the present invention, a simplified object prediction is generated for the concealed section, it being possible according to the simplified object prediction that a potential dynamic object may cross the driving lane of the vehicle at any time in any direction. This makes it possible to disregard the possible reflections or locations in the concealed section of the scanning range for the collision calculation. Such locations arise as soon as the obstruction is unable to shield all radar beams. For example, radar beams may radiate through windows of parked vehicles or through partially concealing vegetation and be used for ascertaining information. A simplified, conservative object prediction is assumed. This prediction contains the information that at any point in time an object may emerge in any direction and at any speed from the concealed area into the visual range of the vehicle and cross the driving lane of the vehicle. This makes it possible to generate the object prediction in a technically particularly simple manner.

According to a further exemplary embodiment of the present invention, the object prediction for the concealed section is rendered more specific by received data of a surroundings model. In order to render the object prediction more concrete, there exists the possibility of making use of information of the vehicle surroundings and generate a more precise object prediction. These data may be taken from a surroundings model for example and may contain all aspects that make it possible to specify the existing prediction.

According to another specific embodiment of the present invention, data regarding intersections, junctions, exits, pedestrian crosswalks, speed limits, number of lanes, and/or turn-off lanes of the surroundings model and/or of the digital map are received, the object prediction for the concealed section being rendered more specific by the received data. For example, if there is an intersection behind the obstacle, it may be assumed that an emerging dynamic object moves along its driving lane at a known maximum speed. A comparable factual situation may be assumed if there is a pedestrian crossing in the concealed section.

According to another exemplary embodiment of the present invention, the object prediction for the concealed section is rendered more specific by measurement data ascertained in the concealed section by at least one sensor. This measure makes it possible to evaluate the reflection points in the concealed area and to use these for the object hypothesis or object prediction. Here it may be assumed that the detected reflection points represent an actual object behind the obstruction, which may emerge in short order from the concealed section of the scanning range.

On the basis of the respective object prediction and the movement of the vehicle, it is possible to perform the collision check. The probability of a possible collision depends on the concrete prediction. A conservative prediction results in a higher probability of the collision. A more concrete prediction is able to reduce the number of potential objects in the concealed section and limit their possible movements for the collision check. The prediction of concealed objects thus directly influences the vehicle behavior while driving by the obstacle.

According to another specific embodiment of the present invention, the object prediction is generated on the basis of a dynamic object ascertained by measurement data or based on a hypothetical assumption of a dynamic object in the concealed section of the scanning range. The dynamic object may be situated in the concealed area and be determined unequivocally, its probable continued travel being determined by the object prediction. Such a dynamic object may be ascertained for example by receiving data via a car-2-x communication connection, data from map data, evaluation of measurement data of a sensor and the like. If no information is available regarding the concealed section, then the object prediction may be generated about possible dynamic objects in the concealed section.

The method makes it possible to define the vehicle behavior in concealed sections and to adapt for example the speed of the vehicle. Alternatively or additionally, an emergency braking action may be initiated more quickly or in a more controlled manner in order to avoid a potential collision with dynamic objects or static objects.

In the following, preferred exemplary embodiments of the present invention are explained in more detail with reference to highly simplified schematic illustrations.

DETAILED DESCRIPTION OF EXAMPLE EMBODIMENTS

Figure 1:
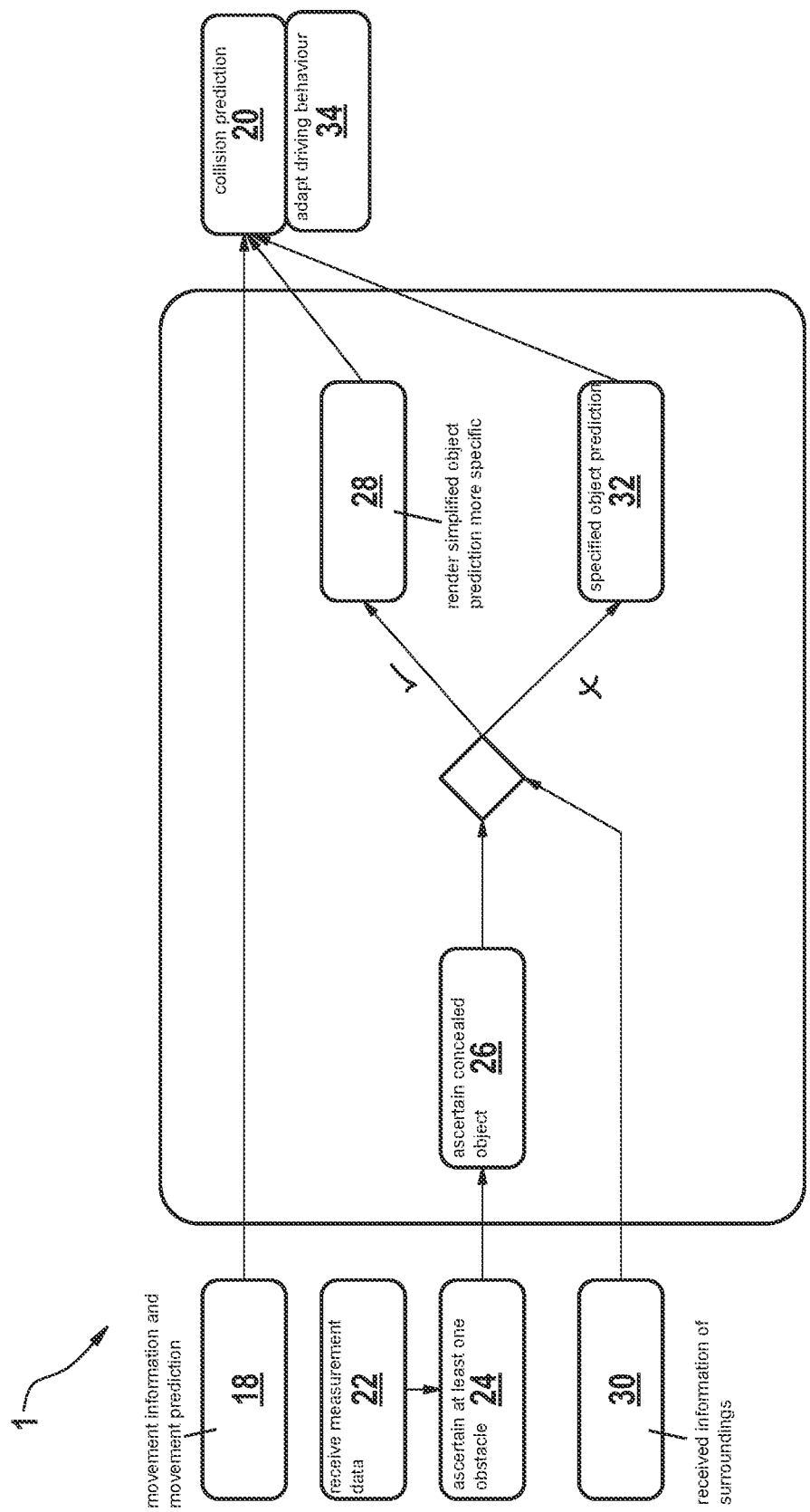
FIG. 1 shows a schematic flow chart for illustrating the method according to a specific embodiment of the present invention.

FIG. 1 shows a schematic flow chart for illustrating the method 1 according to a specific embodiment of the present invention. Method 1 serves to adapt a driving behavior of a vehicle 2 shown in FIG. 2 and in FIG. 3 and may be carried out by a control unit 4. Control unit 4 is developed as a vehicle-side control unit 4 in the represented exemplary embodiments.

Method 1 allows for a prediction of emerging dynamic objects 6 from concealed sections 8 or areas of a scanning range A of at least one radar sensor 10 and/or of a LIDAR sensor 12 of vehicle 2, so that it is possible to initiate a specific behavior of vehicle 2 adapted to the situation.

Method 1 may be implemented in the form of a software component or hardware component. Method 1 may be used as a pre-stage or as an input variable for a collision prediction 20. Movement information and a movement prediction 18 of vehicle 2 may be used for collision prediction 20, the mode of operation of collision prediction 20 not being described in more detail here for the sake of simplicity.

In method 1, measurement data collected by at least one radar sensor 10 and/or LIDAR sensor 12 are received 22.

By evaluating the received measurement data, at least one obstacle 14 is ascertained 24 within scanning range A of radar sensor 10 and/or LIDAR sensor 12.

In a further step 26, on the basis of the ascertained obstacle 14 and an installation position 10 of radar sensor 10 and/or LIDAR sensor 12, a section 8 of scanning range A concealed by obstacle 14 is ascertained.

Figure 2:
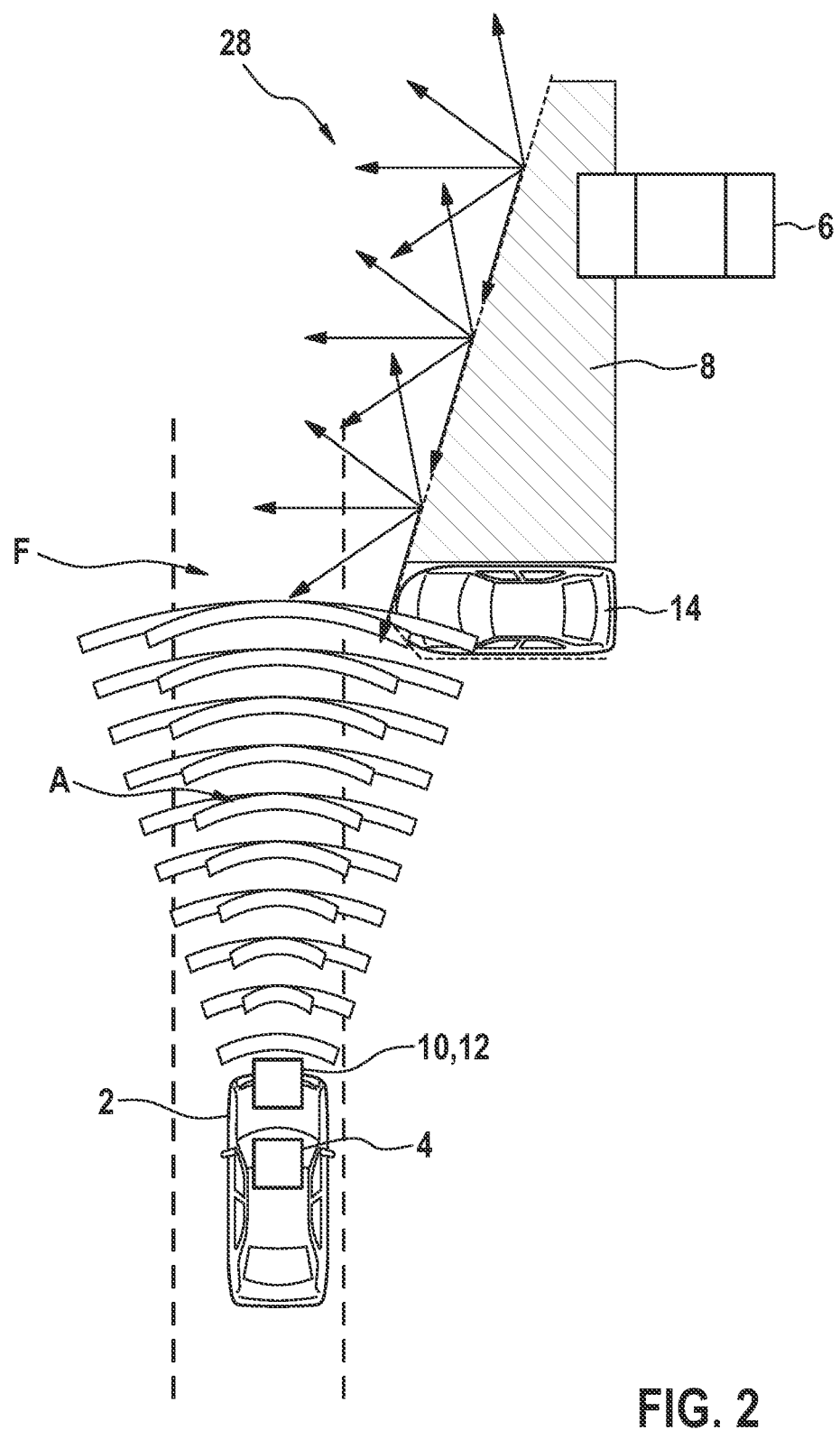
FIG. 2 shows a traffic situation for illustrating a simplified object prediction.

Based on the ascertained concealed section 8, an object prediction 28 is subsequently generated for concealed section 8 of scanning range A. Object prediction 28 may take the form of a simplified object prediction 28. In the simplified object prediction 28, a potential dynamic object 8 may cross a driving lane F of vehicle 2 at any time in any direction. Such an object prediction 28 preferably may be carried out if no further information, such as for example historical trajectory data and the like, is available. This scenario is illustrated in FIG. 2. Here, possible trajectories and positions of a potential dynamic object 6 based on object prediction 28 are represented by arrows.

Figure 3:
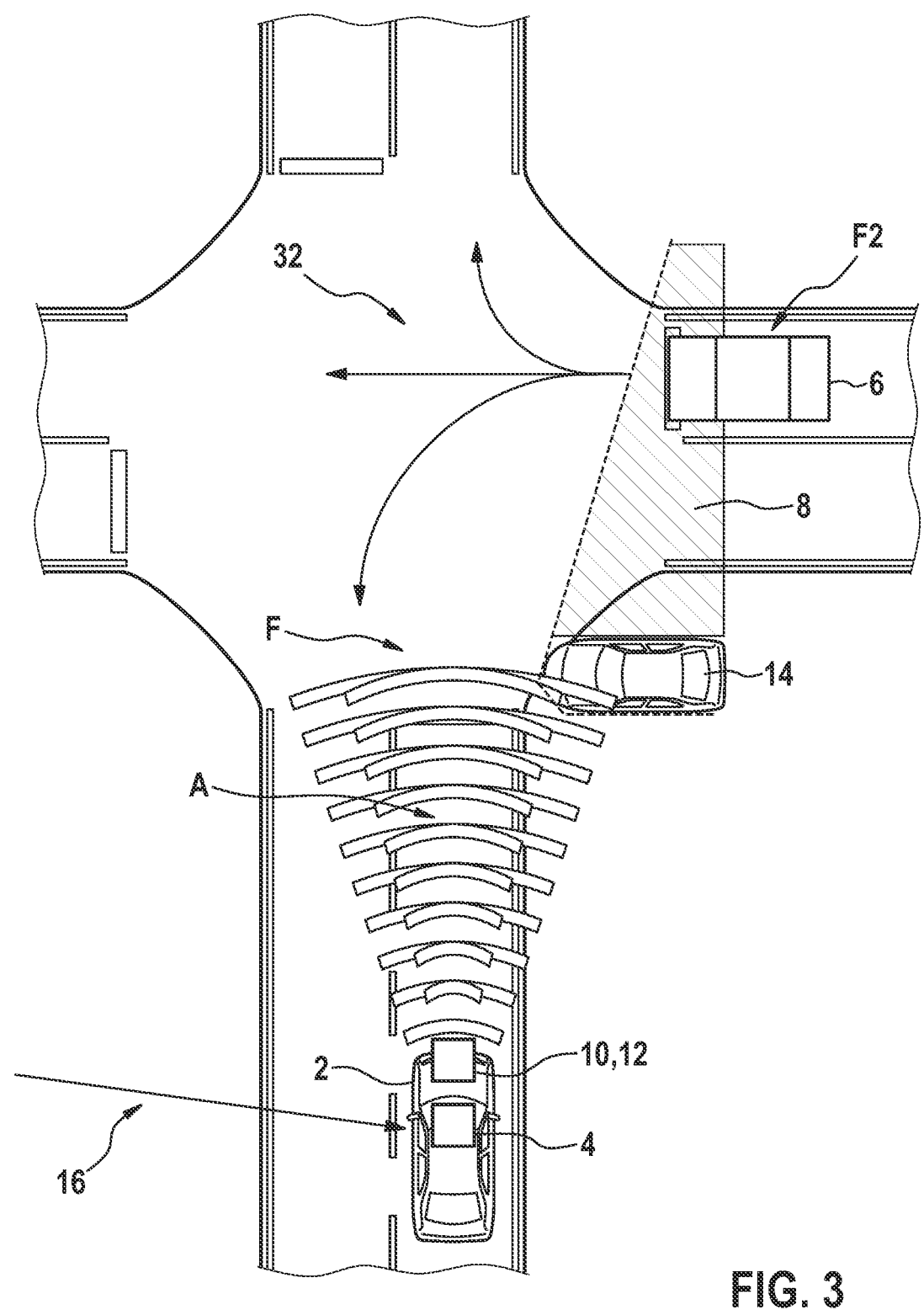
FIG. 3 shows a further traffic situation for illustrating an object prediction that has been rendered more concrete.

Depending on the development of method 1, information of the surroundings 30 about concealed section 8 may be received. For example, it is possible to receive data of a surroundings model, of measurement data, data via a communications connection 16 and the like. This additional information of surroundings 30 may subsequently be used for rendering the simplified object prediction 28 more specific. FIG. 3 shows a traffic situation, in which such a specified object prediction 32 is used.

From map data, control unit 4 is able to ascertain an intersection, in which there exists a concealed section 8. On account of a turn-off lane F2, a potential or hypothetical dynamic object 6 is able to drive over the intersection only in three directions, which are taken into account by specified object prediction 32. The maximally possible speed of potential dynamic object 6 may in this instance also be limited to the customary local speed.

Based on object prediction 28, 32, a driving behavior of vehicle 2 may be adapted 34 as a function of the situation in order to minimize a collision risk with a potential dynamic vehicle 6, which crosses driving lane F of vehicle 2.

The adaptation 34 of the driving behavior of vehicle 2 may take place in parallel to collision prediction 20. The respective data or results of object prediction 28, 32 may be provided to collision prediction 20.

What is claimed is:

1. A method for adaptation of a driving behavior of a vehicle by a control unit, the method comprising the following steps:

receiving measurement data collected by at least one radar sensor of the vehicle;

receiving data of a digital radar map;

identifying at least one obstacle that is within a scanning range of the radar sensor by evaluating the received measurement data, wherein the digital radar map corresponds to surroundings of the vehicle without presence of the at least one obstacle in the surroundings of the vehicle, and the evaluation by which the at least one obstacle is identified includes comparing the collected measurement data to the data of the digital radar map;

based on the identification of the at least one obstacle and based on an installation position of the at least one radar sensor, ascertaining a section of the scanning range that is concealed by the identified obstacle;

determining, for the concealed section of the scanning range, a risk of one or more dynamic objects crossing a driving lane of the vehicle from the concealed section of the scanning range without receiving data identifying presence of the one or more dynamic objects in the concealed section; and adapting, based on the determination of the risk, a driving behavior of the vehicle as a function of a situation.

2. The method as recited in claim 1, wherein:
the method is carried out as part of a collision prediction; or
the determined risk and the driving behavior of the vehicle adapted as a function of the situation are used as input variables of the collision prediction.

3. The method as recited in claim 1, wherein the obstacle and the section of the scanning range concealed by the obstacle are ascertained by additionally evaluating measurement data of a LIDAR sensor and/or measurement data of at least one camera sensor.

4. The method as recited in claim 1, wherein the concealed section of the scanning range is ascertained as a surface or as a volume.

5. The method as recited in claim 1, wherein a simplified object prediction is generated for the concealed section; and according to the simplified object prediction a potential dynamic object can cross a driving lane of the vehicle at any time in any direction.

6. The method as recited in claim 1, wherein the determination of the risk is rendered more specific by received data of a surroundings model.

7. The method as recited in claim 6, wherein:
data of a surroundings are received as data regarding intersections, and/or junctions, and/or exits, and/or pedestrian crosswalks, and/or speed limits, and/or number of lanes, and/or turn-off lanes of the surroundings model and/or of the digital radar map; and
the determination of the risk is rendered more specific by the received surroundings data.

8. The method as recited in claim 1, wherein the determination of the risk is performed based on a hypothetical assumption of a dynamic object in the concealed section of the scanning range.

9. A control unit, wherein the control unit is configured for controlling a driving behavior of a vehicle, wherein the controlling includes:
receiving measurement data collected by at least one radar sensor of the vehicle;
receiving data of a digital radar map;
identifying at least one obstacle that is within a scanning range of the radar sensor by evaluating the received measurement data, wherein the digital radar map corresponds to surroundings of the vehicle without presence of the at least one obstacle in the surroundings of the vehicle, and the evaluation by which the at least one obstacle is identified includes comparing the collected measurement data to the data of the digital radar map;
based on the identification of the at least one obstacle and based on an installation position of the at least one radar sensor, ascertaining a section of the scanning range that is concealed by the identified obstacle;
determining, for the concealed section of the scanning range, a risk of one or more dynamic objects crossing a driving lane of the vehicle from the concealed section of the scanning range without receiving data identifying presence of the one or more dynamic objects in the concealed section; and
adapting, based on the determination of the risk, a driving behavior of the vehicle as a function of a situation.

10. A non-transitory machine-readable storage medium on which is stored a computer program for adapting a driving behavior of a vehicle by a control unit, the computer program, when executed by the control unit, causing the control unit to perform the following steps:
receiving measurement data collected by at least one radar sensor of the vehicle;
receiving data of a digital radar map;
identifying at least one obstacle that is within a scanning range of the radar sensor by evaluating the received measurement data, wherein the digital radar map corresponds to surroundings of the vehicle without presence of the at least one obstacle in the surroundings of the vehicle, and the evaluation by which the at least one obstacle is identified includes comparing the collected measurement data to the data of the digital radar map;
based on the identification of the at least one obstacle and based on an installation position of the at least one radar sensor, ascertaining a section of the scanning range that is concealed by the identified obstacle;
determining, for the concealed section of the scanning range, a risk of one or more dynamic objects crossing a driving lane of the vehicle from the concealed section of the scanning range without receiving data identifying presence of the one or more dynamic objects in the concealed section; and
adapting, based on the determination of the risk, a driving behavior of the vehicle as a function of a situation.

* * * * *